United States Patent
Hirukawa

Patent Number: 6,086,798
Date of Patent: Jul. 11, 2000

[54] METHOD FOR REMOVING CONTAMINANT FROM SURFACE OF MOLD DIE

[75] Inventor: Ken E. Hirukawa, Berkeley, Calif.

[73] Assignee: Abante Corporation, Berkeley, Calif.

[21] Appl. No.: 09/215,888

[22] Filed: Dec. 17, 1998

[51] Int. Cl.[7] .............................. B29D 11/00; B29C 45/00
[52] U.S. Cl. ........................ 264/1.33; 264/39; 264/328.1; 425/225; 425/542
[58] Field of Search ........................... 264/1.33, 39, 169, 264/328.1; 425/225, 542

[56] References Cited

U.S. PATENT DOCUMENTS

| | | | |
|---|---|---|---|
| 4,670,329 | 6/1987 | Pas | 264/39 |
| 4,879,082 | 11/1989 | Kudo et al. | 264/1.33 |
| 4,935,175 | 6/1990 | Kitaura et al. | 264/39 |

FOREIGN PATENT DOCUMENTS

| | | | |
|---|---|---|---|
| 1-157809 | 6/1989 | Japan | 425/225 |
| 1-228809 | 9/1989 | Japan | 264/39 |
| 2-307737 | 12/1990 | Japan | 264/39 |
| 3-202327 | 9/1991 | Japan | 264/39 |
| 921 865 | 4/1982 | U.S.S.R. | 264/39 |

*Primary Examiner*—Mathieu D. Vargot
*Attorney, Agent, or Firm*—Townsend & Townsend & Crew LLP; James K. Okamoto

[57] ABSTRACT

A removable plastic film is attached to the mold die whenever the mold dies needs to be cleaned. Using such a film, the problems with cleaning the mold dies are avoided because whenever the mold dies need cleaning, the film may simply be placed over the mold and simply peeled off to remove all contaminants from the mold. The contaminants stick to the peeled off film and so are removed from the mold.

7 Claims, 6 Drawing Sheets

METHOD FOR REMOVING CONTAMINANT FROM SURFACE OF MOLD DIE

FIELD OF THE INVENTION

The present invention relates to the process of precisely reproducing plastic products. More particularly, it relates to the process of precisely reproducing optical plastic discs via injection molding.

BACKGROUND OF THE INVENTION

Optical plastic discs are a commonly used medium for storing large amounts of information. Optical plastic disc formats include such consumer products as laser discs, compact discs, and digital video discs (DVD).

A proven method of reproducing optical plastic discs is via injection molding. In order to reproduce optical plastic disc via injection molding, a very clean environment and precision equipment is necessary.

Typically, information from a premaster tape is first transferred to and stored on a glass master disc. The glass master disc has a series of microscopic pits and flat areas spiraling from the center of the disc. These pits and flat areas represent the information stored on the glass master disc which is to be reproduced on a metal disc called a "stamper.". The (positive) glass master disc is typically used to create (negative) stampers. The stamper is placed onto a set of mold dies. Mold dies consist of a male metal circular plate and a female metal circular plate, and they are polished to a mirror surface quality. These molds with a stamper create a shell into which molten plastic can be injected for production of optical plastic discs.

During the production process, it is essential to keep the inside surfaces of the mold dies very clean and free of dust and other contaminants, so an operator of an injection molding machine must thoroughly and carefully clean the inside surfaces of the molds whenever the machine is stopped for any reason. Conventional methods of cleaning the surface of a mold are time consuming. Currently, acetone is typically used as a cleaning agent. However, using acetone has several drawbacks including that it produces hazardous fumes and is toxic to humans. Also, currently, relatively expensive gauze-like cloth is used to wipe the molds in the cleaning process. However, when using such cloth, extra care must be taken and skill is required so as not to damage the surface of the mold.

Moreover, the density of the pits and surfaces which stores information on the optical plastic discs continues to increase as technology moves on. For example, the density of pits and surfaces of DVD discs are greater than that of compact discs. This increasing density means that the production process becomes more sensitive to contaminants on the mold dies.

BRIEF SUMMARY OF THE INVENTION

The above-discussed drawbacks and disadvantages relating to the necessity of cleaning the die molds in the current production process are overcome by the present invention. The present invention relates to a removable plastic film which is attached to the mold die whenever the mold dies needs to be cleaned. Using such a film, the problems with cleaning the mold dies are avoided because whenever the mold dies need cleaning, the film may simply be placed over the mold and simply peeled off to remove all contaminants from the mold. The contaminants stick to the peeled off film and so are removed from the mold.

DETAILED DESCRIPTION OF THE PREFERRED EMBODIMENT

Figure 1:
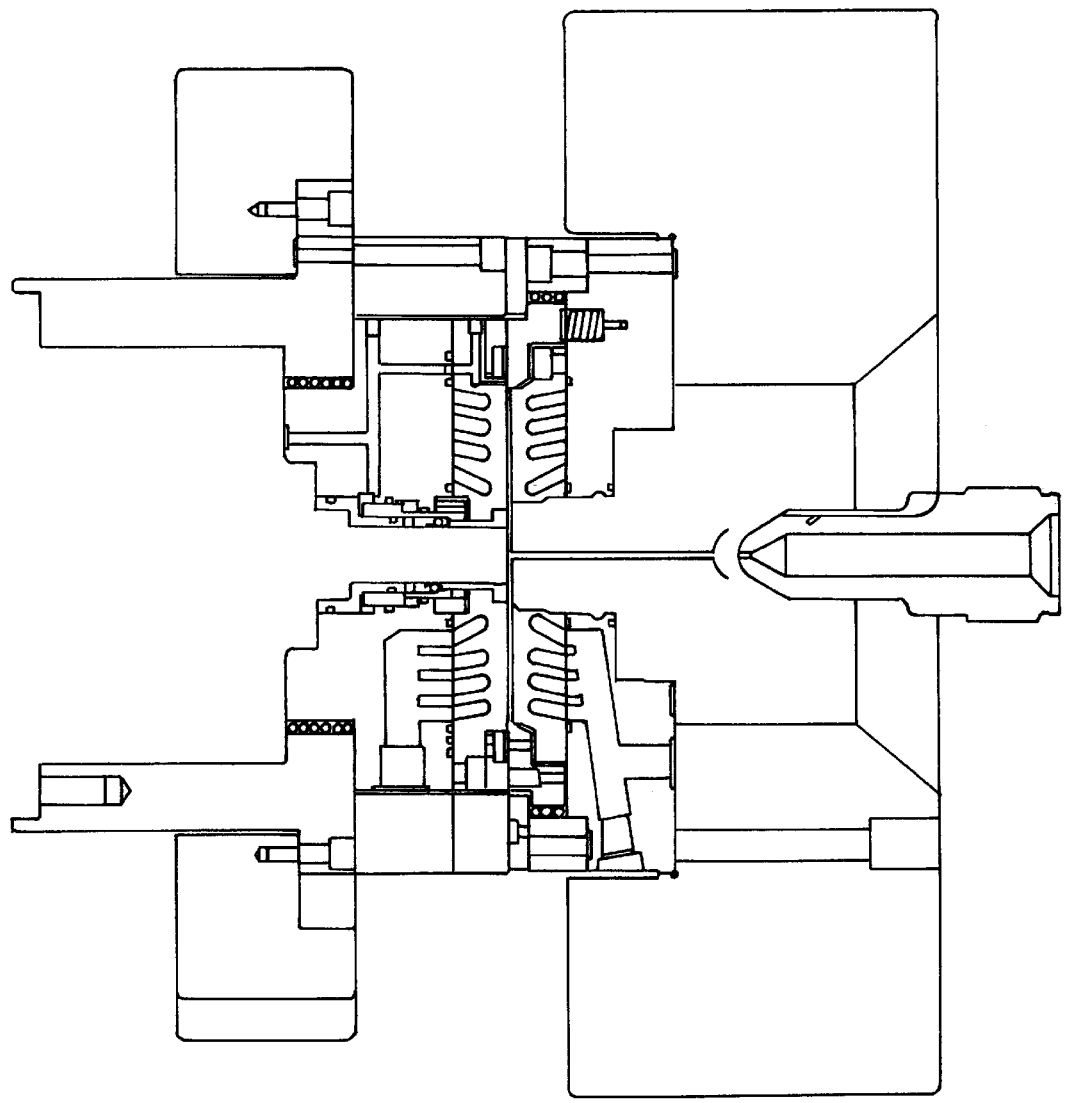
FIG. 1 is a cross-sectional view of a mold attached to an injection molding machine nozzle according to a preferred embodiment of the present invention.

FIG. 1 is a cross-sectional view of a mold attached to an injection molding machine nozzle according to a preferred embodiment of the present invention. The nozzle of the injection molding machine is shown on the right side of the diagram. The mold is shown in the middle of the diagram and is explained in more detail with respect to FIG. 2.

Figure 2:
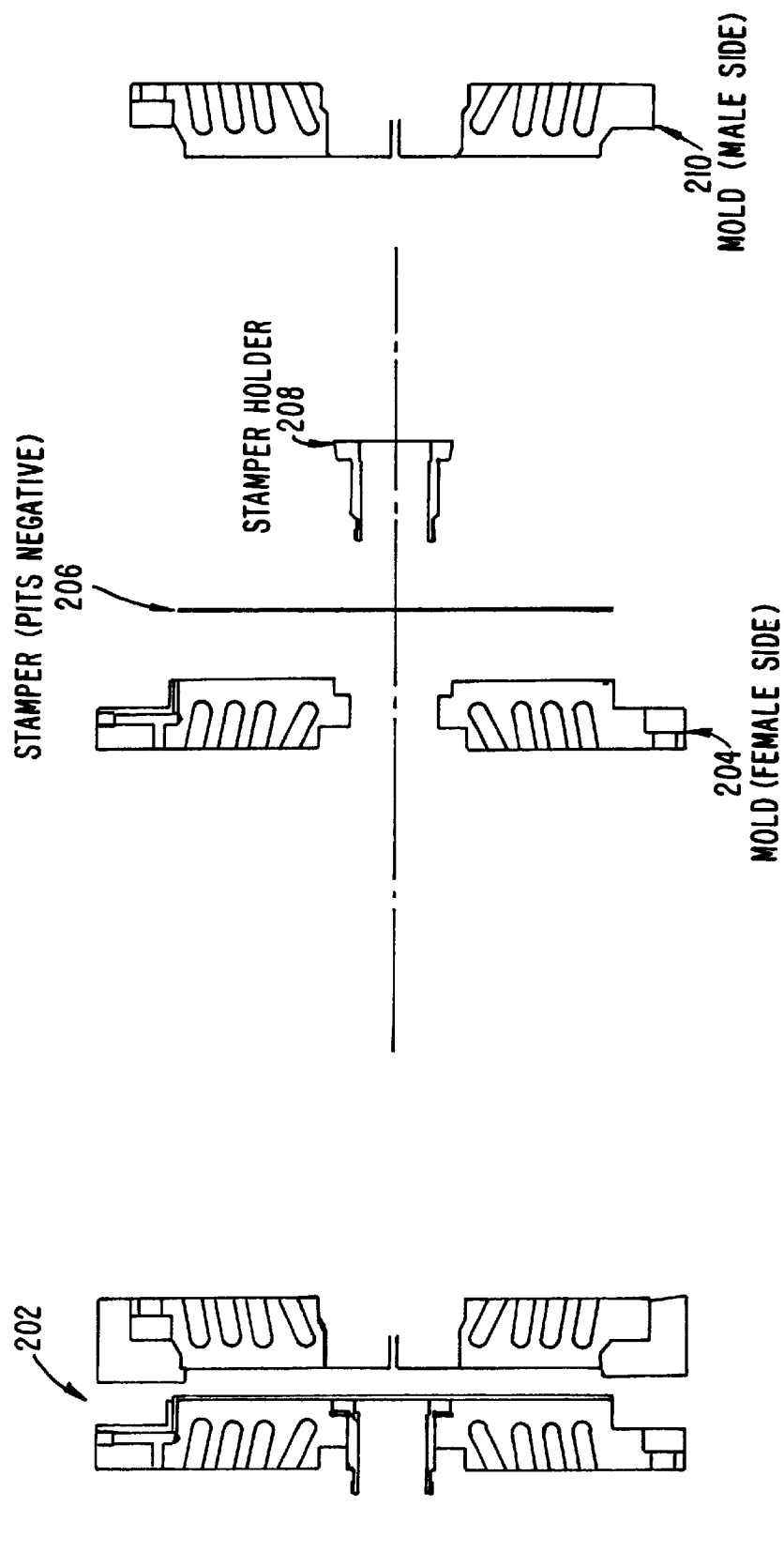
FIG. 2 is a cross-sectional view of the mold 202 and an exploded view of its various parts according to a preferred embodiment of the present invention.

FIG. 2 is a cross-sectional view of the mold 202 and an exploded view of its various parts according to a preferred embodiment of the present invention. FIG. 2 also indicates where a plastic disc is formed within the mold. The mold 202 includes a mold female side 204, a stamper 206, a stamper holder 208, and a mold male side 210.

Figure 3:
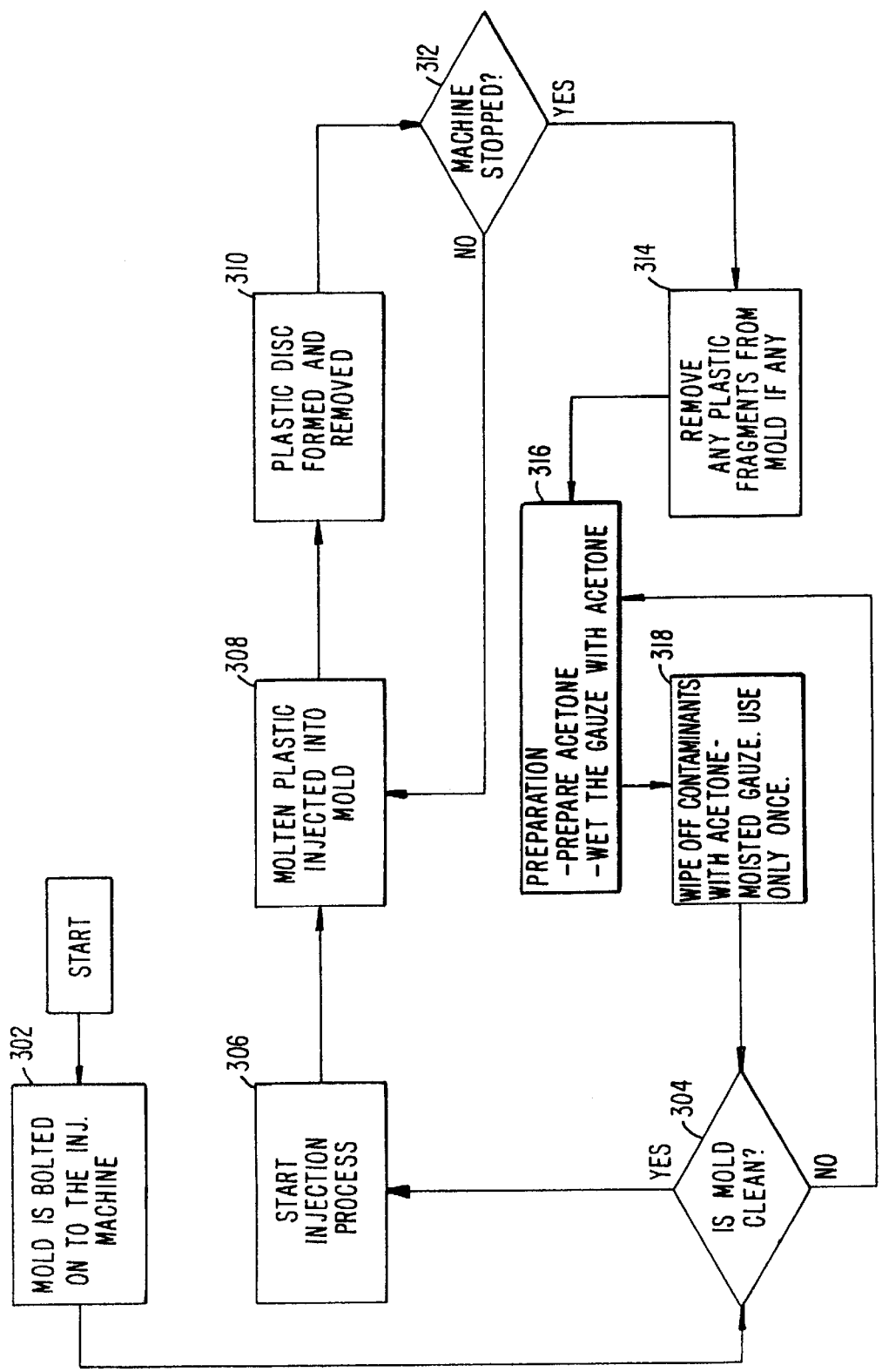
FIG. 3 is a flow diagram of a conventional process for producing optical plastic discs by injection molding.

FIG. 3 is a flow diagram of a conventional process for producing optical plastic discs by injection molding. The process begins in step 302 when the mold 202 is bolted onto the injection machine. The mold 202, of course, includes a stamper 206.

Next, in step 304, a determination is made as to whether or not the mold 202 is clean (i.e. free of contamination inside). Initially, of course, the mold 202 would normally be clean, so the process would continue with step 306.

In step 306, the injection process begins by the injection molding machine. In step 308, molten plastic is injected into the mold. In step 310, a plastic disc is formed in the mold 202 and removed.

In step 312, the injection molding machine may be stopped. If it is not stopped, then the process goes back to step 308. If it is stopped, in particular because the plastic discs being produced contain defects indicating that the mold 202 needs to be cleaned, then the process goes onto step 314.

In step 314, any plastic fragments in the mold are removed. Subsequently, in step 316, a gauze pad is wet with acetone. Then, in step 318, contaminants from the inside surfaces of the mold 202 are removed by wiping the inside surface(s) with the acetone-moistened gauze. The gauze is used only once, then the gauze is disposed. The process then continues with step 304.

In step 304, a determination is made as to whether the mold is clean. If it is not clean, then the process goes back to step 316, and the mold 202 is wiped with a new acetone-moistened gauze pad. If it is clean, then the process loops back to step 306, and the injection process begins again. Typically about three to five gauze pads are used before the mold 202 is clean.

Figure 4:
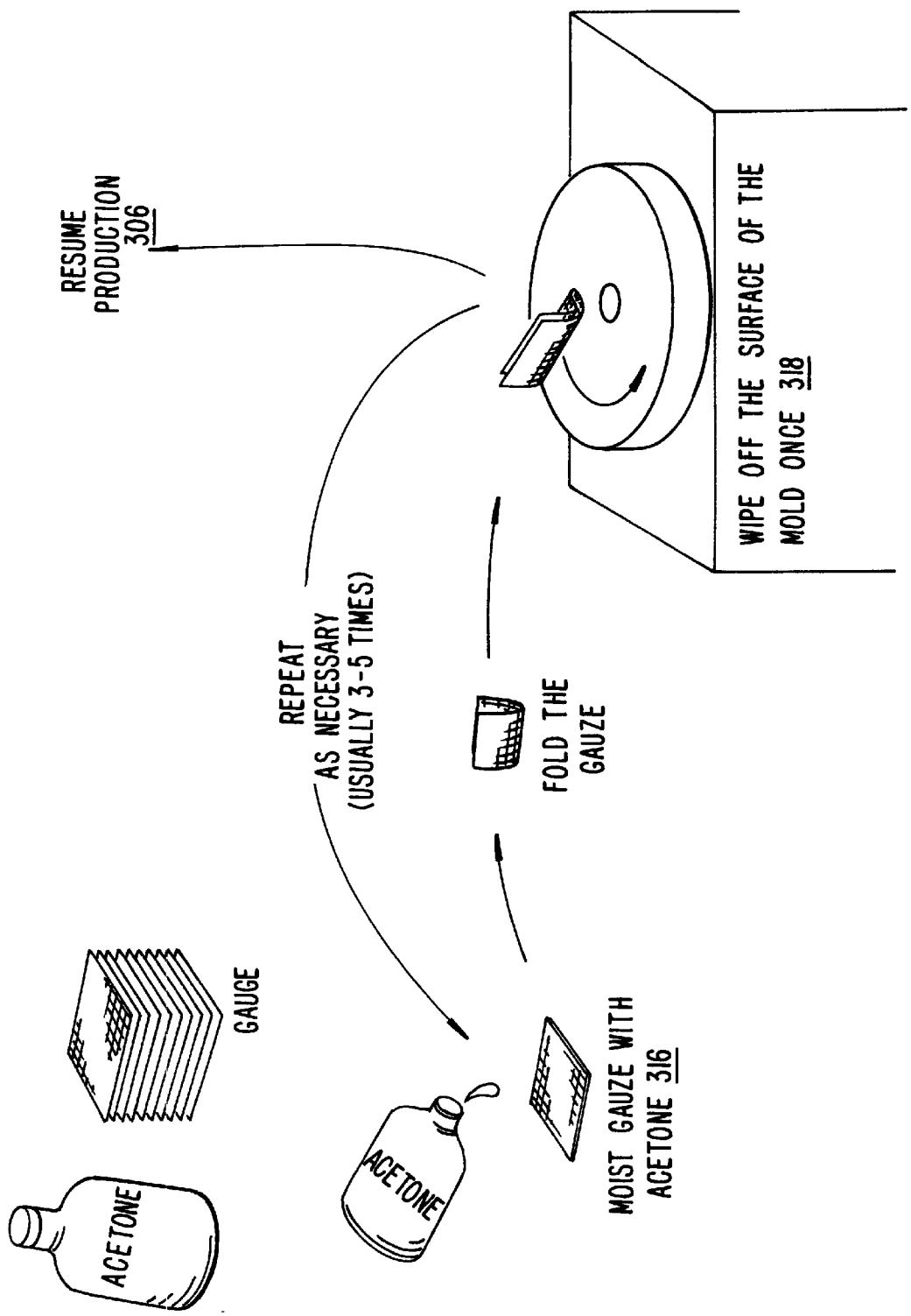
FIG. 4 is an illustration including steps 316 and 318 of the conventional cleaning process.

FIG. 4 is an illustration including steps 316 and 318 of the conventional cleaning process.

As indicated in FIG. 4, the gauze is typically folded before the surface of the mold is wiped. Moreover, steps 316 and 318 are typically repeated 3 to 5 times before the mold 202 is sufficiently cleaned.

Figure 5:
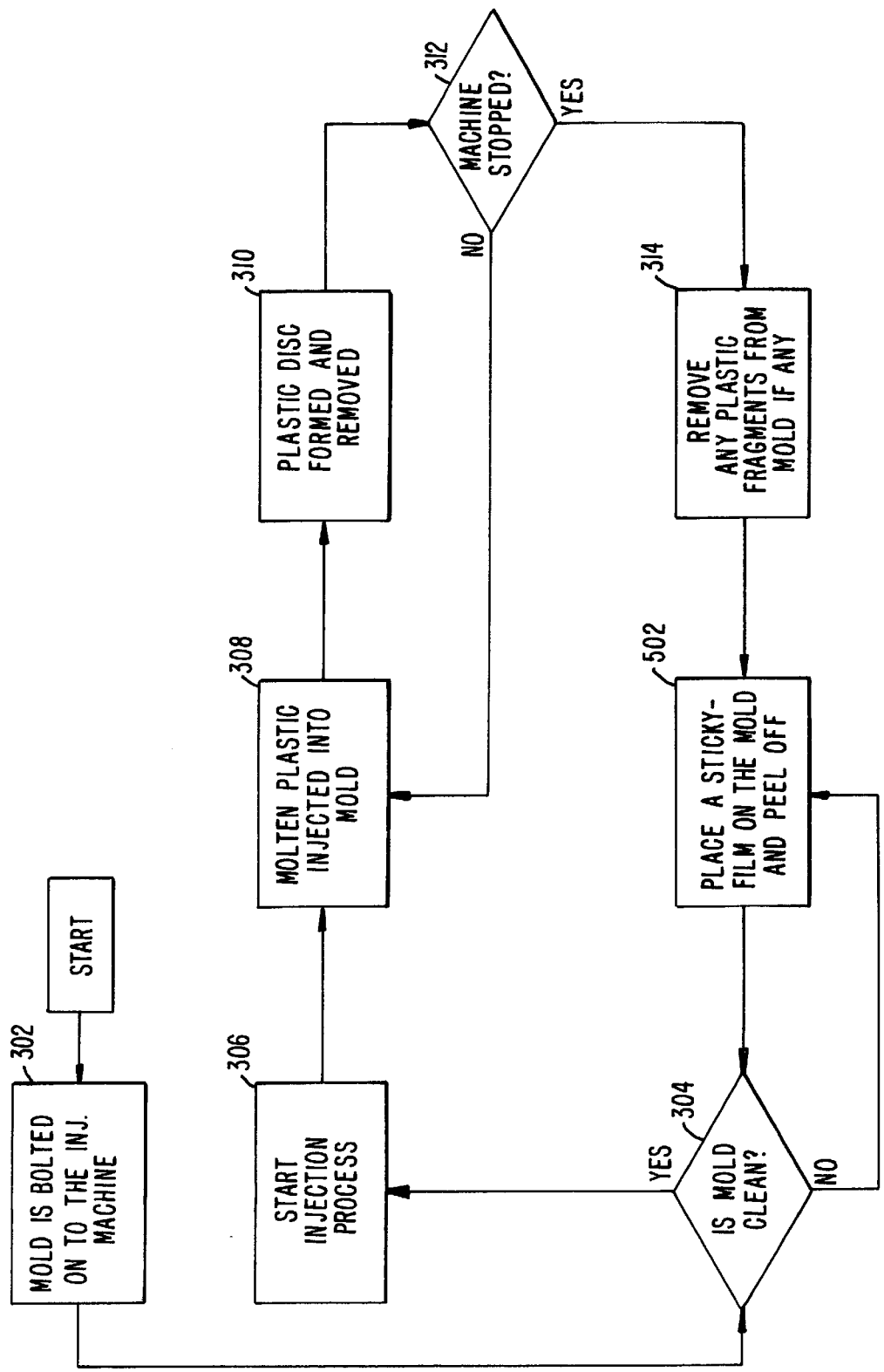
FIG. 5 is a flow diagram, according to a preferred embodiment of the present invention, of a process for producing optical plastic discs by injection molding.

FIG. 5 is a flow diagram, according to a preferred embodiment of the present invention, of a process for producing optical plastic discs by injection molding. The process in FIG. 5 differs from the process in FIG. 3 in that the steps 316 and 318 are replaced by the step 502.

In step 502, a removable plastic film is placed on the inside surface of the mold 202. The surface of the film that makes contact with the surface of the mold 202 is coated with an adhesive such that contaminants readily stick to the film when the film is peeled off. Step 502 is typically much more effective in cleaning the mold 202 than steps 316 and 318. Typically, step 502 does not have to be repeated before the mold is sufficiently clean for the injection process to begin again.

In a preferred embodiment of the present invention, the film is similar to "Saran" wrap for metal parts. Such film is available in a roll form from Nitto Tape in Japan. The film may also be available from other sources, or may otherwise be manufactured by those of skill in the relevant art.

Figure 6:
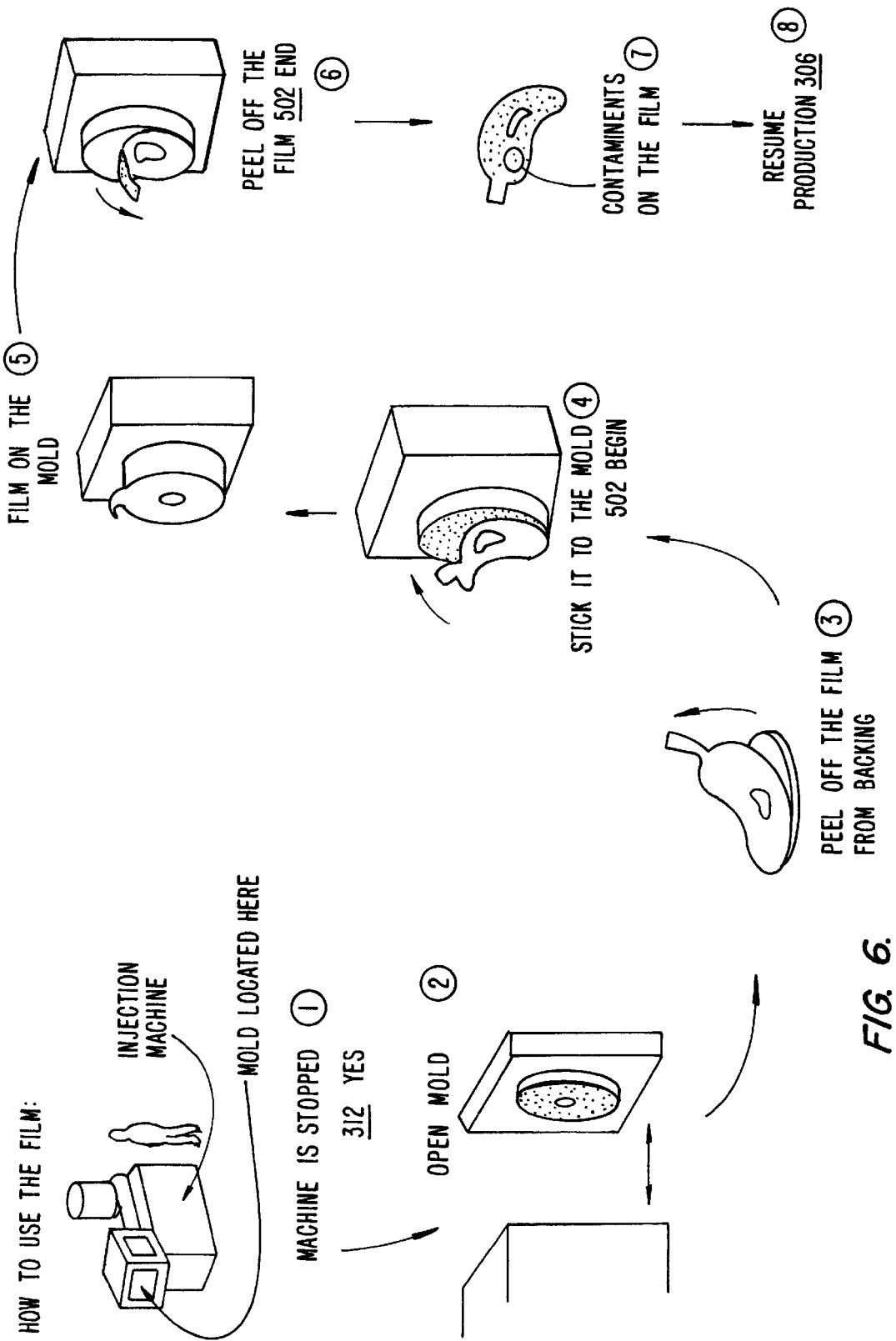
FIG. 6 is an illustration including step 502 of the cleaning process according to a preferred embodiment of the present invention.

FIG. 6 is an illustration including step 502 of the cleaning process according to a preferred embodiment of the present invention. As indicated in FIG. 6, step 502 is typically performed only once before production can be resumed.

The above description is included to illustrate the operation of the preferred embodiments and is not meant to limit the scope of the invention. The scope of the invention is to be limited only by the following claims. From the above description, many variations will be apparent to one skilled in the art that would yet be encompassed by the spirit and scope of the invention.

What is claimed is:

1. A method for producing a product by injection molding, the method comprising:

(a) attaching a mold die to an injection machine;

(b) injecting molten material into the mold die;

(c) forming the product in the mold die from the molten material as the molten material cools;

(d) removing the product from the mold die;

(e) stopping the injection machine and opening the mold die;

(f) attaching an adhesive surface to the mold die, where the adhesive surface is attached to an inside surface of the mold die, wherein the adhesive surface is on one side of a film; and (g) removing the adhesive surface from the inside surface of the mold die, thereby transferring contamination from the inside surface of the mold die to the adhesive surface, without closing clamping, and re-opening the mold die, wherein steps (a) through (d) are repeated multiple times before performing steps (e) through (g), and wherein subsequent to step (g), going back and repeating performance of steps in the method starting from step (a).

2. The method of claim 1, wherein the product comprises a plastic product.

3. The method of claim 2, wherein the plastic product comprises an optical plastic disc.

4. The method of claim 1, wherein the film comprises a thin plastic film.

5. The method of claim 1, wherein the adhesive surface is stored by attaching the adhesive surface to a protective paper which is removed before attaching the adhesive surface to the mold die.

6. The method of claim 5, wherein the protective paper has a non-stick surface and the non-stick surface is attached to the adhesive surface.

7. The method of claim 1, further comprising between steps (e) and (f) the step of removing fragments of material from inside the mold die.

\* \* \* \* \*